(12) United States Patent
Rossetti (10) Patent No.: US 9,658,981 B2
(45) Date of Patent: May 23, 2017

(54) NETWORK INTERFACE CARD FOR A COMPUTING NODE OF A PARALLEL COMPUTER ACCELERATED BY GENERAL PURPOSE GRAPHICS PROCESSING UNITS, AND RELATED INTER-NODE COMMUNICATION METHOD

(71) Applicant: ISTITUTO NAZIONALE DI FISICA NUCLEARE, Fascati (IT)

(72) Inventor: Davide Rossetti, Frascati (IT)

(73) Assignee: ISTITUTO NAZIONALE DI FISICA NUCLEARE, Frascati (RM) (IT)

( * ) Notice: Subject to any disclaimer, the term of this patent is extended or adjusted under 35 U.S.C. 154(b) by 369 days.

(21) Appl. No.: 14/377,493

(22) PCT Filed: Mar. 14, 2013

(86) PCT No.: PCT/IT2013/000076
§ 371 (c)(1),
(2) Date: Aug. 7, 2014

(87) PCT Pub. No.: WO2013/136355
PCT Pub. Date: Sep. 19, 2013

(65) Prior Publication Data
US 2015/0039793 A1 Feb. 5, 2015

(30) Foreign Application Priority Data
Mar. 14, 2012 (IT) .............. RM2012A0094

(51) Int. Cl.
*G06F 13/42* (2006.01)
*H04L 29/08* (2006.01)
(Continued)

(52) U.S. Cl.
CPC ........ *G06F 13/4221* (2013.01); *G06F 13/385* (2013.01); *G06T 1/20* (2013.01);
(Continued)

(58) Field of Classification Search
CPC ... G06F 13/42; G06F 9/46; G06F 9/50; G06T 1/20
See application file for complete search history.

(56) References Cited

U.S. PATENT DOCUMENTS

| 8,910,153 B2 * | 12/2014 | Gupta | G06F 9/5077 |
| | | | 718/1 |
| 2004/0103225 A1 * | 5/2004 | McAlpine | G06F 9/543 |
| | | | 710/52 |

(Continued)

FOREIGN PATENT DOCUMENTS

| WO | 2011/070262 | 6/2011 |
| WO | 2014/031459 | 2/2014 |

OTHER PUBLICATIONS

Holger Froning and Heiner Litz, Efficient Hardware Support for the Partitioned Global Address Space, IEEE, 2010.*

(Continued)

*Primary Examiner* — Henry Tsai
*Assistant Examiner* — Christopher a Daley
(74) *Attorney, Agent, or Firm* — Steinfl + Bruno LLP (57) ABSTRACT

A Network Interface Card (NIC) for a cluster node for parallel calculation on multi-core GPU is described. The NIC has a cluster network including a host and a host memory, a graphics processing unit (GPU) with a GPU memory, a bus and the NIC. The NIC has a transmission network connection block and a reception network connection block. The NIC further includes the following blocks: a transmission block, a reception block, and a GPU memory management block for a direct exchange between the GPU memory and the network through the NIC. An inter-nodal communication method of a nodes cluster, which uses the NIC is also described.

10 Claims, 4 Drawing Sheets

(51) Int. Cl.
  *H04L 12/861* (2013.01)
  *G06F 13/38* (2006.01)
  *G06T 1/20* (2006.01)
(52) U.S. Cl.
  CPC ...... *H04L 49/90* (2013.01); *G06F 2213/3808* (2013.01); *G06T 2200/28* (2013.01)

(56) References Cited

U.S. PATENT DOCUMENTS

| | | | | |
|---|---|---|---|---|
| 2005/0286544 | A1* | 12/2005 | Kitchin | H04L 49/90 370/412 |
| 2010/0013839 | A1* | 1/2010 | Rawson | G06F 3/14 345/502 |
| 2010/0146068 | A1* | 6/2010 | Haviv | G06F 3/0613 709/212 |
| 2010/0270943 | A1* | 10/2010 | Cook | A61L 9/03 315/291 |
| 2011/0202623 | A1* | 8/2011 | Williams | H04L 67/1097 709/207 |
| 2012/0131124 | A1* | 5/2012 | Frey | G06F 15/16 709/212 |
| 2013/0057560 | A1* | 3/2013 | Chakraborty | G06F 13/14 345/520 |
| 2013/0148947 | A1* | 6/2013 | Glen | H04N 5/917 386/355 |
| 2014/0047165 | A1* | 2/2014 | Nemazie | G06F 12/0246 711/103 |
| 2014/0098113 | A1* | 4/2014 | Sabony | G06T 1/20 345/505 |
| 2014/0317221 | A1* | 10/2014 | Froening | G06F 15/167 709/212 |
| 2015/0288624 | A1* | 10/2015 | Raindel | H04L 49/90 709/219 |

OTHER PUBLICATIONS

Holger Froning et al, Efficient Harwarke Support For Partitioned Global Space, Universistat Heidelberg, Computer Architecture Group.*
Sangman Kim et al Networking Abstraction for GPU Programs, 2011.*
Yiannis Georgiou Resource Management with Linux Control Groups in HPC Clusters , Apr. 2012.*
International Search Report mailed on Jun. 10, 2013 for PCT/IT2013/000076 filed on Mar. 14, 2013 in the name of Istituto Nazionale Di Fisica Nucleare.
Written Opinion mailed on Jun. 10, 2013 for PCT/IT2013/000076 filed on Mar. 14, 2013 in the name of Istituto Nazionale Di Fisica Nucleare.
Holger Froning, et al. "Efficient hardware support for the Partitioned Global Address Space" Parallel & Distributed Processing, Workshops and PhD Forum (IPDPSW), 2010, 1-6.
Ogata, Y. et al. "An efficient, model-based CPU-GPU heterogeneous FFT library" 2008 IEEE International Symposium on Parallel & Distributed Processing, Miami, FL. 1-10.
Vetter, J.S. et al. "Keeneland: Bringing Heterogeneous GPU Computing to the Computational Science Community" *Computing in Science and Engineering*, vol. 13, No. 5 (2011) 90-95.
Teng, L. et al. "GPU Resource Sharing and Virtualization on High Performance Computing Systems" *International Conference on Parallel Processing* 2011, 733-742.

* cited by examiner

NETWORK INTERFACE CARD FOR A COMPUTING NODE OF A PARALLEL COMPUTER ACCELERATED BY GENERAL PURPOSE GRAPHICS PROCESSING UNITS, AND RELATED INTER-NODE COMMUNICATION METHOD

CROSS REFERENCE TO RELATED APPLICATIONS

The present application is the US national stage of International Patent Application PCT/IT2013/000076 filed on Mar. 14, 2013 which, in turn, claims priority to Italian Patent Application RM2012A000094 filed on Mar. 14, 2012.

This invention is about the design of a network interface card (NIC) for a computing node of a parallel computer accelerated by use of General Purpose Graphics Processing Units (GPGPUs or simply GPUs), and the related inter-node communication method.

This invention is about a hardware peripheral card and an method to interface the computing nodes of a parallel computer accelerated by GPUs in such a way that there is direct data exchange between each GPU and its related NIC, without going through intermediate host memory buffers. This method reduces the inter-nodal communication time and speeds up the computation.

The application area of the invention is mainly the distributed computing, ranging from a few networked nodes up to massively parallel supercomputers with thousands of nodes, like those used for High Performance Computing (HPC).

The scaling behavior of a numerical parallel application at varying number of execution nodes, is linked to its intrinsic characteristics, as the kind of computation, the size of the data base, the ratio of local and remote memory access, the pattern of network traffic.

The application speed-up, i.e. the speed-up of the parallel application with respect to the serial one, is a function $S=S(N)$ which is parameterized by the number of computing nodes N. $S(N)$ usually shows different characteristics at varying N, e.g. $S(N)$ can be linear up to tens or hundreds of nodes, then it can reach a plateau and it can even go down beyond a certain threshold value.

The use of a GPU as a numerical computation accelerator imposes additional complications to the parallel application. In fact, before and after each inter-node communication step, it is necessary to copy data between the GPU memory and the host main memory, where the host computer, the GPU and the NIC constitutes the aforementioned computing node.

As an example, if the host of node A has to move a data array, produced in its GPU, to the node B GPU, the following steps are necessary:
1. Host A waits for the end of the computation on its GPU.
2. Host A copies the data array from the GPU memory to a temporary host memory buffer.
3. Host A sends the temporary buffer to node B using its NIC.
4. Host B receives the data in a temporary host memory buffer.
5. Host B copies the temporary host memory buffer to its final destination in GPU memory
6. Host B spawns a new computation on its GPU, involving the newly arrived data.

In some cases, depending on some technical details of the NIC and the GPU, additional memory copies may be necessary.

In most cases, the application require multiple data arrays to carry on its computation, so the steps 2 to 5 has to be repeated over and over.

On top of this, each time the GPU computation needs an inter-node network data exchange, the computation has to be split at least into two chunks, in such a way that the multiple cores of the GPU are synchronized and stopped, and the data array(s) moved from GPU to host memory, as described above. This procedure introduces an overhead, which is proportional to the synchronization and stopping time of the particular GPU. That time is of the order of some microseconds on model GPUs.

Moreover, the very point of splitting the computation into chunks introduces additional overhead as the whole calculation is effectively slowed down, e.g. as GPU memory caches are invalidated, some data structures are to be re-created, etc.

The aforementioned steps 2 and 5, do they simply appear as technical details, are necessary as the NIC is typically unable to access the GPU memory, only the host memory. The data exchange implied by the memory copies in 2 and 5, for sufficiently big buffer sizes, can be optimized by using a pipelining technique in which a big copy can be split into multiple smaller chunks, and the network transmission of each chunk can be issued as soon as it is copied, in such a way that memory copy and transmission of different chunks can be overlapped.

Instead, for small buffer size, where small is can be defined as the size for which the GPU to host memory copy time cannot be reduced any further due to the constant overhead of the copy itself, the above technique is useless.

For example, for a data arrays of 128 bytes, the GPU-to-host copy time is dominated by the fixed overhead of the operation, of the order of some microseconds. The network communication time is again of the order of the microsecond. So in the end, the time cost of the sequence 2-3-4-5 is at least 3 microsecond for 128 bytes, or in other words, the two memory copies amount to 66% of the sequence. The time of the step 1 has to added to the whole, but it has to be done only once whatever the number of data arrays.

Furthermore, in general the numerical applications may require the exchange of multiple data arrays to/from another GPU, and each communication may target more than one GPU.

As an example, the numerical simulation computations for High Energy Particle Physics, such as Lattice Quantum Chromo-dynamics (LQCD), where a four dimensional discretized space-time lattice of points is simulated, every GPU has to communicate with up to eight neighboring GPUs (2 GPUs along each dimensional axis).

The aim of this invention is to provide an optimized network interface card (NIC) for a GPU accelerated parallel computer, which overcomes the problems and limitations of current technical solutions.

Additionally, the aim of this invention is to provide a method for inter-node communication utilizing the aforementioned NIC.

A subject-matter of this invention is a network Interface Card or "NIC" for a cluster node for parallel calculation on multi-core GPU, the cluster network including a host and a host memory, whereon a calculation application can be installed, a GPU with a GPU memory, a bus and a NIC, the NIC comprising a transmission network connection block and a reception network connection block, the NIC network interface card being characterized in that it further comprises the following blocks:

a transmission block, which comprises means suitable to receive data from the GPU memory and metadata from the Host through said bus, and to route them towards said transmission network connection block;

a reception block, which comprises means suitable to receive data from said reception network connection block and to provide them to the GPU memory through said bus, a GPU memory management block, which comprises means suitable to send metadata to the GPU to control the reading or writing of data from/into the memory of the same GPU, on the basis of metadata received respectively from said reception block or said transmission block;

thus realizing a direct Exchange between the GPU memory and the network through the NIC, avoiding that the data pass through the Host.

Preferably according to the invention, the card further comprises an events queue management block, which comprises a circular memory buffer to write events queues in said Host memory or said GPU memory, in such a way that the application running on the Host be informed that the GPU memory is being used or is available for use.

Preferably according to the invention, the card further comprises, when the cluster node comprises a GPU configured to transmit data, a direct transmission block for transmission from GPU, which includes means suitable to receive from the GPU both the data to be transmitted and the relevant metadata, and to route them towards said transmission network connection block, in such a way that the GPU starts an operation of transmission with respect to the NIC, without any intervention of the host.

Preferably according to the invention, said direct transmission block includes a message control logic and a message buffer, the message buffer being suitable o receive data from the GPU, the message control logic being suitable to receive metadata from the GPU.

Preferably according to the invention, said transmission block and said reception block comprise each a control logic and respectively a transmission buffer and a reception buffer.

Another subject-matter of the present invention is a method of inter-nodal communication in a nodes cluster, each node including a Host, with a Host memory, whereon a calculation application is installable, a multi-core GPU with a GPU memory, a bus and a NIC, the NIC comprising a transmission network connection block and a reception network connection block, the method comprising the use of the RDMA technique for the communication of data packets between a receiving node and a transmitting node, wherein the receiving node, in a preliminary step, registers a reception buffer in the NIC and communicates its memory address to the transmitting node, the method being characterized in that each node utilizes the NIC card according to the invention and in that:

in said preliminary step:
the calculation application of the receiving node pre-allocates one or more buffers on the GPU memory of the receiving node;
the calculation application of the receiving node register in advance the memory addresses of said one or more buffers in the NIC of the receiving node, forming a buffer registration list;
said receiving node communicated in advance the memory addresses of said one or more buffers to the transmitting node;

said transmitting node sends the data starting from its GPU memory, utilizing the transmission block of its NIC to said receiving node together with metadata containing the memory address of said one or more buffers, the receiving node utilizing the reception block;

when receiving data packets, the reception block of the NIC of the receiving node recognizes the memory addresses of said one or more buffers and sends the received data to its GPU memory, utilizing the GPU memory management block.

Preferably according to the invention, the data transmission between transmitting node and receiving node comprises the following steps internal to the transmitting node:

T1. The host communicates to said transmission block of the NIC metadata relevant to the data transmission, including the amount of data to be transmitted and the virtual address of the GPU memory buffer wherein the data to be transmitted find themselves;

T2. Said transmission block sends said metadata relevant to the data transmission to said GPU memory management block;

T3. Said GPU memory management block sends metadata to the GPU which provoke the transfer of the data from said virtual address to said transmission buffer;

T4. As soon as all the data of said amount of data are in said transmission buffer, said transmission block communicates said metadata relevant to the data transmission o said transmission network connection block;

T5. said transmission network connection block of the NIC of the transmitting node chooses the suitable destination path and begins to collect data from said transmission buffer and to send them into the network.

Preferably according to the invention, the data reception between transmitting node and receiving node comprises the following steps internal to the receiving node:

R1. The reception network connection block receives a data packet, comprising a header, and pass it to said reception block;

R2. The data are temporarily memorized in said reception buffer and the header of the same is analyzed by a logic of the reception block, which:

R2-a. reads in the header the dimension in byte of the packet and the memory address to which the data are destined;

R2-b. if said memory address to which the data are destined corresponds to a GPU memory buffer, the operation is completed by said reception block, otherwise the operation is entrusted to a further block suitable to address the data towards the host memory;

R2-c. said reception block searches the virtual memory addresses interval in said buffer registration list;

R2-d. if the search of step R2-c is successful, the virtual memory addresses interval is decomposed in sub-intervals $I_1, I_2, \ldots, I_n$;

R3. For each sub-interval $I_j$ with j=1, 2, . . . , n, with n a natural integer, R3-a. said reception block asks to said GPU memory management block to send metadata to the GPU in such a way to make the memory region interested by $I_j$ accessible, through PCI express bus or other local bus;

R3-b. The transfer of the data portion concerning the sub-interval $I_j$ is executed from said reception buffer to the GPU memory;

R4. Said events queues management block, as notice of completion of the operation in step R3, executes the writing of an event on the events queue in the host memory.

Preferably according to the invention, the method uses the NIC according to the invention it executes the following subsequent steps internal to the transmitting node:
  one of the core of the GPU writes in said direct transmission block:
    metadata for claiming the use of said message buffer;
    metadata relevant to the data transmission;
  one or more core of the GPU begin to load data concurrently in said message buffer;
  as soon as the data loading is terminated, a core, in particular the last one that completed the calculation operations, writes in said direct transmission block metadata to declare that said message buffer is ready to be read;
  said direct transmission block remarks the writing of the previous step and begins the operation of fragmentation and sending of data packets loaded in the previous step towards the transmission network connection block.

Preferably according to the invention, the method uses the network interface card of the invention and in that it comprises the following further step:
  said events queues management block, as a notice of completion of the reception or transmission operation, executes the writing of relevant metadata on a suitable prepared Host memory, which works as events queue.

The invention will be described thoroughly but not restrictively, referring to the diagrams in the accompanying figures.

In the following we define some acronyms and words, which may be used in the following:
  Cluster: it is a parallel computer in which the computation nodes are mostly off-the-shelf components, sometimes equipped with numerical accelerators and a high performance, low latency interconnection network (interconnect).
  CFD: computational fluid dynamics
  FB: frame buffer or GPU memory, it is the memory private to the GPU, typically 1 to 6 GBytes.
  GPGPU or simply GPU: General Purpose Graphics Processing Unit.
  Interconnect: the interconnection network linking together the computing nodes of a parallel computer.
  Application scaling: it is the performance, e.g. time to solution or results per time unit, as a function of the number of computing units.
  Peripheral bus, or simply bus: it is the expansion bus linking the host and its peripherals, the most common nowadays is the PCIexpress (PCIe) bus.
  RDMA, or Remote Direct Memory Access: it is a technique by which receive buffers are pre-register (before their effective use) on the RX NIC, and their address communicated to the TX application, so that the TX application can transmit data messages carrying the destination memory address of the RX node with them.

The invention includes original HW blocks and methods to employ them with the aim of implementing the functionalities listed below:
a) "P2P GPU TX and RX", i.e. Peer-to-Peer receiving and transmission: moving data directly between the NIC and the GPU across the peripheral bus, without having to place data on temporary host buffers. In particular, this invention has a P2P GPU RX feature by which the received data goes directly on the final destination GPU memory buffers (technically called zero-copy technique), which employs the RDMA technique.
b) "GPU-as-TX-initiator", by which the computation routines running on the GPU are able to initiate a transmission operation, instead of the host, avoiding the step 1 in the previous list.

For small size network transfer, the feature a) allows skipping steps 2 and 5 (in the previous list), saving on time by roughly 66% of the whole 2-5 sequence.

For large size network transfer, it is more complex to estimate the advantages offered by a). In the traditional approach, without the invention feature a, it is possible to pipeline the transmission of a large data vector by splitting it into smaller chunks, and by overlapping the steps 2 (GPU memory to host temp buffer) and 3 (host temp buffer to the NIC) on subsequent chunks. However the transit on host temporary buffers may generate considerable trashing of the data cache (data cache drops valuable data to make space for data on transit to/from the network), reducing the performance of the application running on the host. But anyway, it is known on literature that important numerical application shows a traffic pattern with relatively small message sizes.

Feature a) relies on the RDMA technique, extending it by adding the capability to receive message directly on GPU memory. Traditionally, the RDMA technique splits the abstract receive operation into two phases: in an initialization phase, the application on the RX node allocates some receive memory buffers, pre-registers them on its NIC, and communicates the address of those buffers to the nodes which will be sending data. At a later time, the transmitting node emits data messages carrying a destination memory address with them. By using the HW blocks subject of the invention, on processing an incoming message, the receiving NIC selects those destined to GPU memory buffers, which were originally allocated on the GPU and pre-registered on the NIC, and directly moves the message data to the right GPU memory buffer.

Traditionally even in the presence of the GPU, the initiator of a transmission is the host GPU which is running the application code. By using the feature b) according to this invention instead, the GPU acquires the ability to initiate a transmission on the NIC without host mediation. This ability potentially brings two optimizations:
  saving a few microseconds of step 1 ("the host waits of the GPU").
  Avoiding the split of the GPU code, to make space for the host initiating the transmission, so that the calculation can go through quickly.

The main concepts, used in the following descriptions, are:
a. Message, a single unit of transmission of arbitrary size, and fragmentation, which is the splitting of a message into packets of fixed maximum size, as required by the lower level network protocol.

b. Virtual memory, which involves the splitting of memory into pages and a two-way page mapping between virtual and physical page addresses. Both the host and the GPU may use such kind of indirection. A peripheral accesses the memory by its physical address while the execution units of the host or GPU by its virtual address.

c. RDMA, Remote Data Memory Access, is a zero-copy receive scheme which needs pre-registration of receive buffers and preventive communication of their virtual address to the sender. It usually includes an RDMA PUT primitive, in which a local buffer is copied onto a remote memory area, and may offer a RDMA GET primitive, by which a remote memory area is fetched and copied onto a local memory buffer.

d. Bus mapping of a peripheral address range, e.g. one of the NIC control blocks, by the GPU. The GPU is then able to access the NIC control block. This is a feature that is supported by some GPUs.

The hardware blocks (control logics, memory buffers, registers) used in this invention are below:
  i. NIC_GPU_TX block
  ii. NIC_GPU_RX block
  iii. NIC_GPU_DMA block
  iv. NIC_EQ block
  v. NIC_DIRECT_GPU_TX block In the following, we describe three data flows, which are depicted respectively in FIG. 1-3. Two are transmission flows (TX) while the third is a receive one (RX), and they actively involve the HW blocks which are part of this invention and the subject of this patent request.

The premise is that the computing node, e.g. one of many in a parallel computer, is executing a GPU accelerated application.

Figure 1:
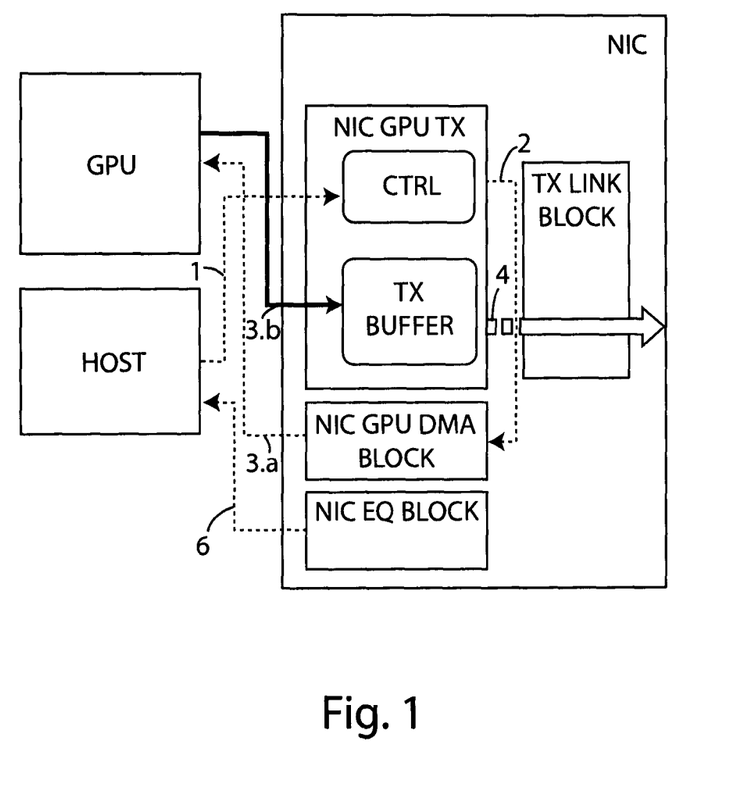
FIG. 1 depicts the P2P GPU TX feature of the invention, which allows an application running on the host to trigger, or initiate, a transmission operation (TX op) of data residing on a GPU memory buffer.

FIG. 1: P2P TX, Host Initiator, TX from GPU Memory, Directly Across the Bus

By referring to FIG. 1, the P2P GPU TX feature, which is part of this invention, allows an application running on the host to initiate a transmission of GPU data passing directly over the peripheral bus. The described architecture allows for a zero-copy approach, i.e. without copies on intermediate memory buffers, the NIC fetching data from their original GPU memory location.

The following steps exemplifies the use of the NIC_GPU_TX block:

a. The host writes the transmission details (TX_INFO), e.g. the network address of the destination node (DEST_NODE_ADDR), the message size (TX_SIZE), the virtual address of the source GPU memory address (GPU_MEM_ADDR) where data resides.

b. NIC_GPU_TX passes GPU_MEM_ADDR and TX_SIZE to the NIC_GPU_DMA block, and then it waits for the full message data to be loaded in the TX_BUFFER.

c. NIC_GPU_DMA block (FIG. 1 table 3.a) manipulates the GPU in such a way that GPU data at address GPU_MEM_ADDR are loaded into the TX_BUFFER (3.b). The details are GPU dependent.

d. When the all the data (TX_SIZE) are ready in the TX_BUFFER, NIC_GPU_TX pushes the TX_INFO to the TX_LINK block (prior-art) and signals the end-of-operation to the NIC_EQ block.

e. TX_LINK_BLOCK establishes the right communication path towards the network and starts injecting data taken from the TX_BUFFER.

f. NIC_EQ block, signaling the operation completion, writes some event data structure in a proper (either GPU or host) memory area which acts as an event queue (EQ). In this way the application is signaled that the GPU memory has been read and can be reused.

Figure 2:
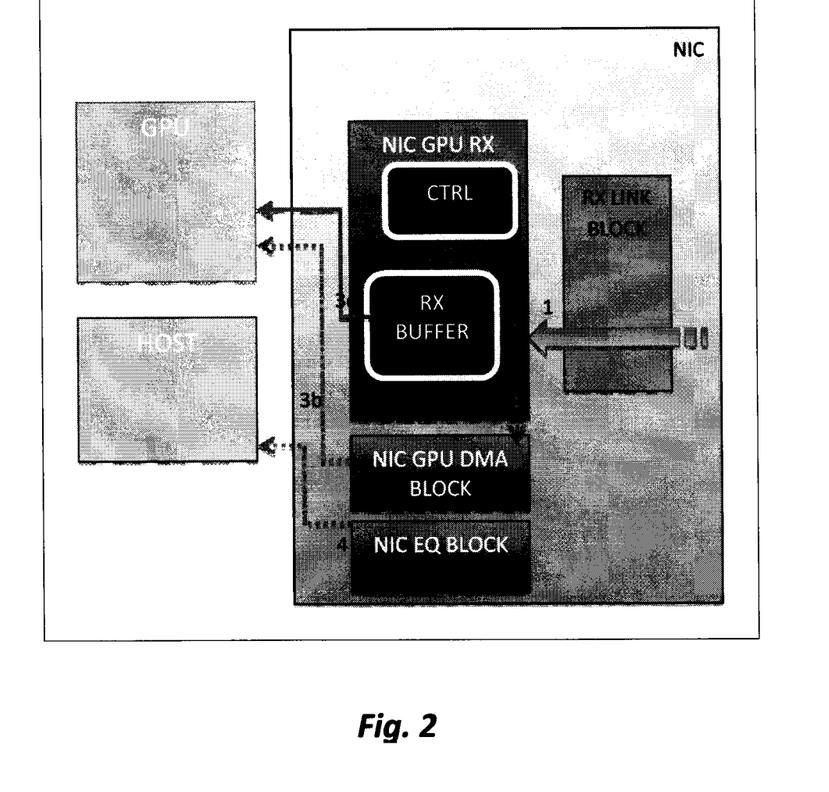
FIG. 2 depicts the P2P GPU RX feature of the invention, which allows the NIC to autonomously carry on the receiving of a network message by placing data on a GPU memory buffer.

FIG. 2: P2P RX, Host Initiator, RX on GPU Memory, Directly Across the Bus

By referring to FIG. 2, the P2P GPU RX feature, which is part of this invention, allows for the NIC to autonomously carry on the RX operation of a message targeted to a GPU memory buffer.

The described zero-copy architecture allows for message data to reach their final destination without intermediate buffers, which means that (for RX GPU buffers) data goes straight through the bus to the GPU memory. The proposed method extends the RDMA technique (prior-art) to GPU memory buffers, and relies on the application running on the host to pre-register GPU RX buffers before their use (prior art) on the NIC_GPU_RX (patenting block).

The RX steps for a packet destined to GPU memory is:

a. RX_LINK block receives a data packet from network channels and forwards them to the NIC_GPU_RX block.

b. Data are buffered in RX_BUFFER and the packet header is processed by CTRL logic.

c. The CTRL logic block parses the header and retrieves the packet size (RX_SIZE) and the virtual address (DEST_MEM_ADDR) of the final memory destination.

d. If DEST_MEM_ADDR matches a GPU memory RX buffer, the packet is handled by the NIC_GPU_RX (CTRL), otherwise it is moved and processed by some other block (prior art) specialized for host memory.

e. NIC_GPU_RX looks up the virtual memory range [DEST_MEM_ADDR, DEST_MEM_ADDR+RX_SIZE-1] onto the list of pre-registered GPU buffers.

f. If it is found, the memory range is split into sub-ranges $I_1, I_2, \ldots, I_n$ according to the characteristics of the GPU. For example, the virtual-to-physical mapping for 4 KB GPU pages and a maximum packet size of 4 KB, there can be two sub-intervals at most.

g. For each sub-interval $I_j$, with $j=1, 2, \ldots, n$:
  a. NIC_GPU_RX triggers the NIC_GPU_DMA, which manipulates the GPU to make it accessible the memory region from the bus.
  b. NIC_GPU_DMA does its work by proper writing some GPU configuration registers.
  c. NIC_GPU_RX generates a DMA transaction on the bus to move the data corresponding to the sub-range $I_j$ from RX_BUFFERS to the GPU memory.

h. NIC_EQ block, as a completion signal of the whole RX operation, writes an event onto the event queue (EQ) in host memory (prior art). The event is got by the application that processes the just received memory buffers.

Figure 3:
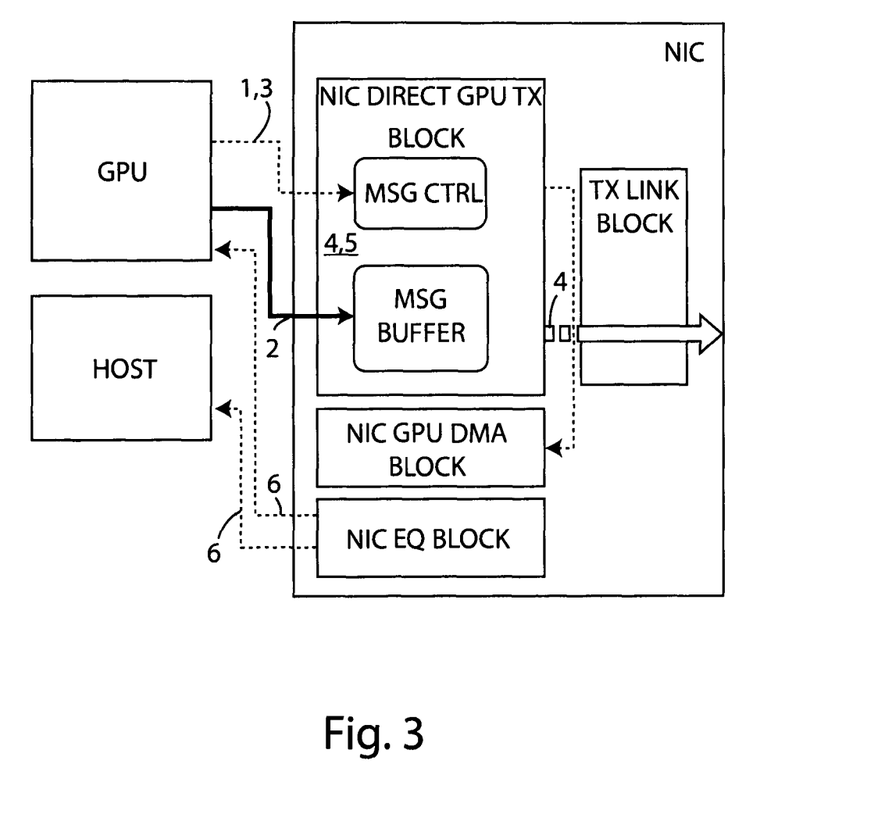
FIG. 3 depicts the "GPU-as-TX-initiator" feature of the invention, which allows the GPU to initiate a transmission operation directly on the NIC, without mediation by the host.
Figure 4:
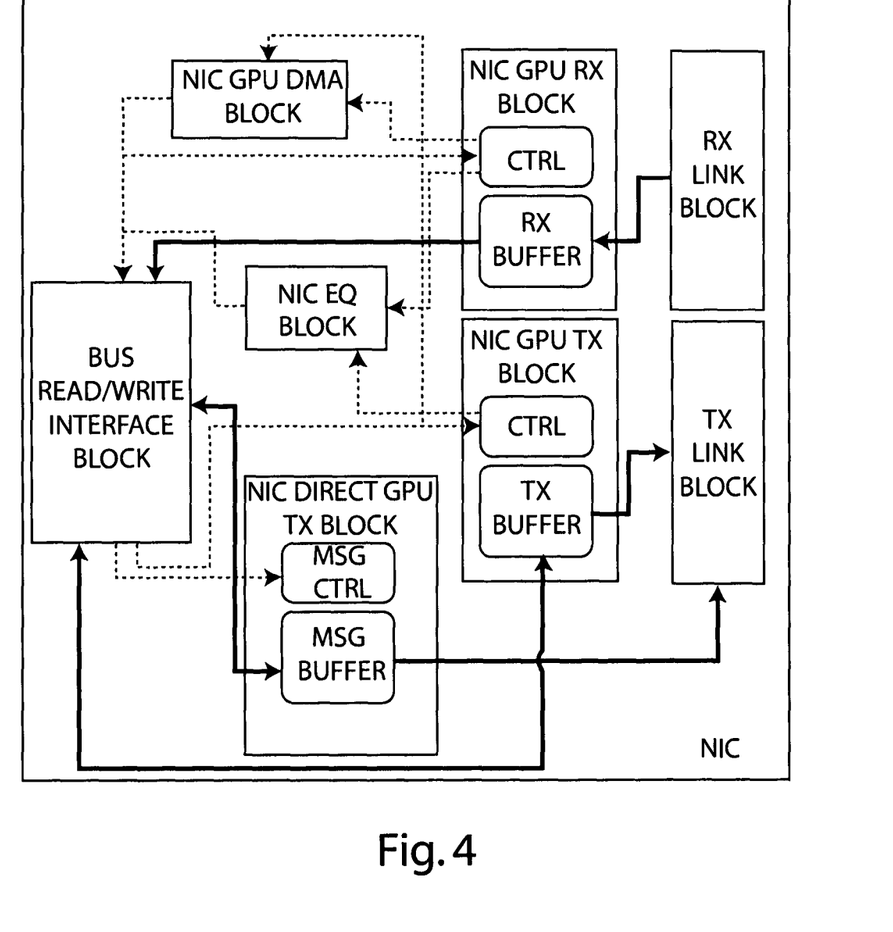
FIG. 4 shows the high-level diagram with all the functional blocks of the NIC and the flow of data and metadata among them, according to the implementation depicted in FIGS. 1-3.

FIG. 3: GPU Initiator, GPU Uploads Data on NIC

As depicted in FIG. 3, the GPU-as-TX-initiator feature, which is part of this invention, allows the GPU to initiate a transmission on the NIC, i.e. the GPU is able to send messages on the network without any help by the host.

This feature is useful when the transmission time is short, e.g. small message size, compared to the time necessary to use the P2P TX feature (we remind the reader that P2P TX scheme implies that the GPU has to stop all its computing cores before the host can initiate a communication, and then the GPU has to resume its computation). For big message sizes, i.e. for a transmission time greater than the GPU stop-resume cycle time, it can be more performing to use the P2P TX feature.

To implement this feature, the NIC offers an additional HW block, named NIC_DIRECT_GPU_TX, which is directly accessible (bus mapped) on the bus (e.g. PCI Express) by the GPU. It is important for the GPU to have the ability to map the NIC_DIRECT_GPU_TX block and manipulate it programmatically inside GPU computing codes.

In the following we use the concept of message transmission, i.e. the transmission operation acting on an arbitrary size of data, and message fragmentation, i.e. the splitting of a large message transmission into smaller chunks each one meant to be transmitted by a network packet (taking into account the max packet size, the control flow on the network channels, the filling state of intermediate storage buffers).

As previously explained, as the GPU has many computing units and it is relatively slow at synchronizing globally, it is important to implement and optimize the use case of small-to-medium message size (i.e. 128 KB), introducing the automatic fragmentation of messages into packets of limited maximum size (e.g. 4 KB).

In this approach, the GPU has to proactively upload the message data onto the NIC_DIRECT_GPU_TX block. The fastest way, the one using the full internal memory bandwidth of the GPU, is that in which multiple computing units, in principle all of them, are used at once. But the GPU computing units are usually loosely synchronized if any, so there has to be provision for the possibilities that the message data are uploaded onto the NIC_DIRECT_GPU_TX block out-of-order, e.g. the 4096-8191 chunk lands on the block before the 0-4095 chunk because they are handled by different units. This is handled by the use of a reorder buffer (MSG_BUFFER), which is an addressable memory buffer located on the NIC in the aforementioned block.

The NIC_DIRECT_GPU_TX block is made up of control registers, control logic and memory buffers, and exposes at least two sub-blocks: MSG_BUFFER and MSG_CTRL.

The GPU has to be able to access MSG_BUFFER and MSG_CTRL by the bus mapping functionality, in particular the GPU computing kernels have to be allowed to read/write from/to both the MSG_BUFFER and MSG_CTRL sub-blocks of NIC_DIRECT_GPU_TX, translating these operations into their respective bus operations. This capability is available on at least one of the commercially available GPU cards.

MSG_BUFFER is a bus-mapped temporary storage area on which the GPU can upload the message data before triggering the message processing by the NIC. When the message size is greater than the maximum packet size, the NIC_DIRECT_GPU_TX block fragments the data into multiple packets. MSG_BUFFER acts as a reorder buffer, i.e. an area on which data can be uploaded in an out-of-order manner.

MSG_CTRL is a bus-mapped set of control registers which hosts the message delivery information, among the others. These registers are mailboxes which can be written (read) both by the GPU on the bus and by the block internal logic. Among the registers there are:

MSG_DEST_NODE, the destination node address.
MSG_SIZE, the byte size of the message.
MSG_DEST_MEM_ADDR, the virtual address of the RX memory buffer on the destination node.
CTRL_LOCK, a register which is written by the GPU to flag the message has been fully uploaded.
CTRL_STATUS, a register where the internal logic flags that the data in the MSG_BUFFER has been fully processed, e.g. moved to intermediate buffers further up along the chain, so that MSG_BUFFER is free to host new data.

In the following we describe the different steps in the use of the NIC_DIRECT_GPU_TX block:

a) one of the GPU computing units (core) writes the CTRL_LOCK register, to assert the ownership of the MSG_BUFFER, and then writes the transmission information into the MSG_DEST_NODE, MSG_SIZE and MSG_DEST_MEM_ADDR of MSG_CTRL. As MSG_BUFFER is a resource shared between the GPU and the NIC logic, the GPU has to explicitly flag the NIC of its will to write on it. CTRL_LOCK is used roughly as a mutual exclusion primitive.

b) One or more GPU cores copy the message data on the MSG_BUFFER, potentially in parallel.

c) When all the cores end their copying, one of the GPU cores, e.g. the one which ended as the last, writes the CTRL_LOCK register (on MSG_CTRL) a certain bit which flag the MSG_BUFFER as ready to be processed.

d) When the NIC_DIRECT_GPU_TX internal logic is triggered by the CTRL_LOCK flag, it reacts by flagging a STATUS_MSG_PROCESSING state on the CTRL_STATUS register, which keeps the GPU from interfering with the ongoing message processing (fragmenting and transmission along the network transmission TX_LINK block).

e) When all the data in MSG_BUFFER are consumed, the NIC_DIRECT_GPU_TX internal logic clears the CTRL_STATUS flag, and optionally informs the NIC_EQ block of the success/error condition.

f) NIC_EQ block, optionally in the sense that it is not meant to be invoked after every single operation but only after some important group of operations, as it is the case also of the previous figures, signals the completion of the operation by writing an event on a event queue (EQ) which can be located on both the GPU (by using the NIC_GPU_DMA block) or the host memory. The event is handled by the application which is then free to restart this procedure from step a).

The preferred embodiments have been above described and some modifications of this invention have been suggested, but it should be understood that those skilled in the art can make variations and changes, without so departing from the related scope of protection, as defined by the following claims.

The invention claimed is:

1. A Network Interface Card (NIC) for parallel calculation of a cluster node on multi-core Graphical Processing Units (GPU), the cluster node including a host and a host memory, whereon a calculation application can be installed, a GPU with a GPU memory, a bus and the NIC, the NIC comprising:
 a transmission network connection block,
 a reception network connection block,
  a transmission block, which comprises means configured to receive data from the GPU memory and metadata from the host through said bus, and to route the data towards said transmission network connection block;
  a reception block, which comprises means configured to receive data from said reception network connection block and to provide the data to the GPU memory through said bus, and
  a GPU memory management block, which comprises means configured to send metadata to the GPU to control the reading or writing of data from/into the memory of the same GPU, on the basis of metadata received respectively from said reception block or said transmission block, wherein realizing a direct exchange between the GPU memory and a network through the NIC, and avoiding passing data through the host.

2. The Network Interface Card according to claim 1, further comprising an events queue management block, which comprises a circular memory buffer configured to write events queues in said host memory or said GPU memory, wherein an application running on the host is informed whether the GPU memory is being used or is available for use.

3. The Network Interface Card according to claim 1, further comprising a direct transmission block for data transmission from GPU, which includes means configured to receive from the GPU both the data to be transmitted and relevant metadata, and to route the data and relevant metadata towards said transmission network connection block, in such a way that the GPU starts an operation of transmission with respect to the NIC, without intervention of the host.

4. The Network Interface Card according to claim 3, wherein said direct transmission block includes a message control logic and a message buffer, the message buffer configured to receive data from the GPU, and the message control logic configured to receive metadata from the GPU.

5. The Network Interface Card according to claim 1, wherein said transmission block and said reception block comprise each a control logic and respectively a transmission buffer and a reception buffer.

6. A method of inter-nodal communication in a nodes cluster, each node including a host, with a host memory, whereon a calculation application is installable, a multi-core Graphical Processing Unit (GPU) with a GPU memory, a bus and a Network Interface Card (NIC), the NIC comprising a transmission network connection block and a reception network connection block, the method comprising the use of a remote direct memory access (RDMA) technique for a communication of data packets between a receiving node and a transmitting node, wherein the receiving node, in a preliminary step, registers a reception buffer in the NIC and communicates its memory address to the transmitting node, wherein each node utilizes the NIC according to claim 1, the method comprising:

a) in said preliminary step:
   pre-allocating the calculation application of the receiving node for the one or more buffers on the GPU memory of the receiving node;
   registering the calculation application of the receiving node in advance for the memory addresses of said one or more buffers in the NIC of the receiving node, forming a buffer registration list; and
   communicating, via said receiving node in advance the memory addresses of said one or more buffers to the transmitting node;

b) sending the data by said transmitting node starting from the GPU memory of the transmitting node, to said receiving node together with metadata containing the memory address of said one or more buffers, wherein the transmitting node uses the transmission block of the NIC of the transmitting node, and the receiving node uses the reception block; and c) when receiving data packets, recognizing the memory addresses of said one or more buffers via the reception block of the NIC of the receiving node and sending the received data to the GPU memory of the receiving node by utilizing the GPU memory management block.

7. The method according to claim 6, wherein the data transmission between the transmitting node and the receiving node comprises the following steps internal to the transmitting node:

T1. communicating metadata relevant to the data transmission, from the host to said transmission block of the NIC, the metadata including the amount of data to be transmitted and the virtual address of the GPU memory buffer where the data is stored;

T2. sending said metadata relevant to the data transmission from said transmission block to said GPU memory management block;

T3. sending metadata from said GPU memory management block to the GPU which provokes the transfer of the data from said virtual address to said transmission buffer;

T4. communicating said metadata relevant to the data transmission, as soon as all the data of said amount of data are in said transmission buffer, from said transmission block said transmission network connection block; and T5. choosing the suitable destination via said transmission network connection block of the NIC of the transmitting node, beginning to collect data from said transmission buffer and sending the data into the network.

8. The method according to claim 6, wherein the data reception between the transmitting node and the receiving node comprises the following steps internal to the receiving node:

R1. receiving a data packet via the reception network connection block, comprising a header, and passing the data packet to said reception block;

R2. temporarily memorizing the data in said reception buffer and analyzing the header of the data by a logic of the reception block, comprising the following steps:
   reading in the header the dimension in byte of the packet and the memory address to which the data are destined;
   if said memory address to which the data are destined corresponds to a GPU memory buffer, completing the operation by said reception block, otherwise entrusting the operation to a further block configured to address the data towards the host memory;
   searching the virtual memory addresses interval via said reception block in said buffer registration list; and
   if the search of the virtual memory address is successful, deposing the virtual memory addresses interval in sub-intervals $I_1, I_2, \ldots, I_n$;

R3. For each sub-interval $I_j$ with $j=1,2, \ldots, n$, with n a natural integer,
   asking via said reception block to said GPU memory management block to send metadata to the GPU to make the memory region interested by $I_j$ accessible, through PCI express bus or other local bus; and
   executing a transfer of the data portion concerning the sub-interval $I_j$ from said reception buffer to the GPU memory; and R4. executing via said events queues management block as notice of completion of step R3, the writing of an event on the events queue in the host memory.

9. The method according to claim 6, wherein the NIC further comprises a direct transmission block for data transmission from GPU, which includes means configured to receive from the GPU both the data to be transmitted and relevant metadata, and to route the data and relevant metadata towards said transmission network connection block, in such a way that the GPU starts and operation of transmission with respect to the NIC, without intervention of the host and the NIC executes the following subsequent steps internal to the transmitting node:

writing, via one of the core of the GPU, in said direct transmission block metadata for claiming the use of said message buffer, and metadata relevant to the data transmission;

beginning to load data, via one or more core of the GPU, concurrently in said message buffer;

writing via a core, as soon as the data loading is terminated, in particular the last core that completed the calculation operations, in said direct transmission block metadata to declare that said message buffer is ready to be read; and     remarking the writing of the previous step via said direct transmission block, and beginning the operation of fragmentation and sending of data packets loaded in the previous step towards the transmission network connection block.

10. The method according to claim 6, wherein the NIC further comprises an events queue management block, which comprises a circular memory buffer configured to write events queues in said host memory or said GPU memory, wherein an application running on the host is informed whether the GPU memory is being used or is available for use, the method comprising the following further step:

executing the writing of relevant metadata, via said events queues management block as a notice of completion of the reception or transmission operation is received, on a suitable prepared host memory, the host memory configured to work as the events queue.

\* \* \* \* \*